UNITED STATES PATENT OFFICE.

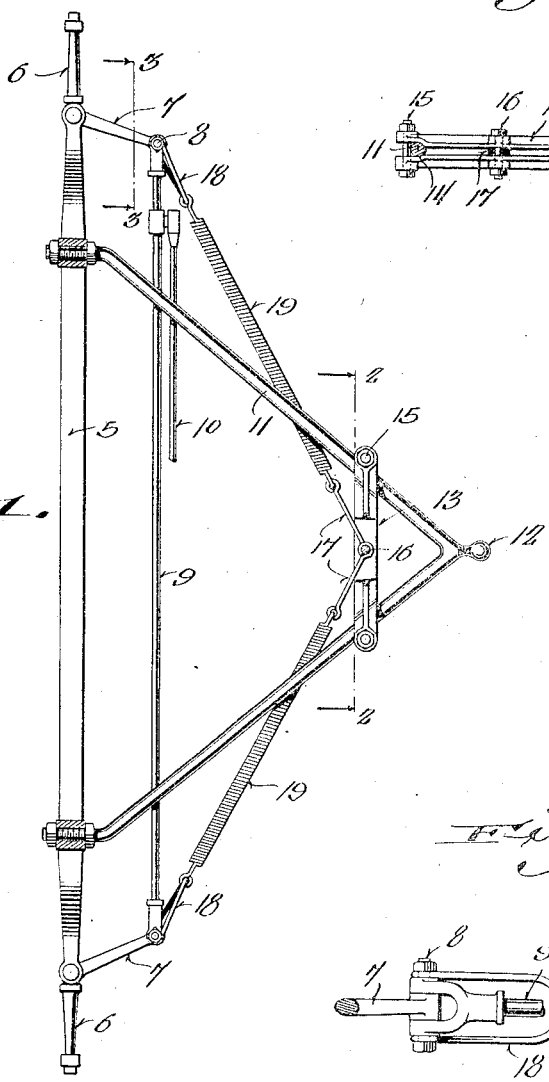

ARTHUR SENGER, OF MILWAUKEE, WISCONSIN.

STEERING ATTACHMENT FOR VEHICLES.

1,355,171.  Specification of Letters Patent.  Patented Oct. 12, 1920.

Application filed July 1, 1919. Serial No. 307,974.

*To all whom it may concern:*

Be it known that I, ARTHUR SENGER, a citizen of the United States, and resident of Milwaukee, in the county of Milwaukee and State of Wisconsin, have invented certain new and useful Improvements in Steering Attachments for Vehicles; and I do hereby declare that the following is a full, clear, and exact description thereof.

My invention relates to new and useful improvements in the front axle and steering structures of automobiles, and is more particularly directed to the provision of a steering control and radius rod brace device which may be associated with the Ford or other similar type of automobile, as an attachment therefor.

It is the object of my invention to provide brace means adapted for securement to the front axle radius rods which serve also for the securement of spring control members adapted for connection with the steering mechanism of the automobile whereby the steering mechanism is normally urged to direct the automobile in a straight path and prevent deflections of the steering wheels incidental to uneven nature of the roadway over which the automobile travels.

A further object resides in the provision of a combined attachment of this nature which is of exceedingly simple construction, and which may be connected with an automobile in a manner requiring no modification of the structure thereof, and utilizing various automobile connecting parts for securement of the attachment.

With the above and other objects and advantages in view, the invention resides more particularly in the novel combination, arrangement and formation of parts more particularly hereinafter described and pointed out in the appended claim.

In the drawings:

Figure 1 is a plan view of the front axle structure of an automobile, showing the improved attachment associated with the radius rod and steering mechanism thereof.

Fig. 2 is a detail sectional view taken on the line 2—2 of Fig. 1.

Fig. 3 is a detail sectional view showing the method of attachment of the spring controlled links to a spindle arm the plane of this section being indicated by the line 3—3 of Fig. 1.

Referring now more particularly to the accompanying drawings, 5 designates the front axle of an automobile, and more particularly of the Ford type, at the ends of which are mounted the usual wheel carrying spindles 6 having the steering arms 7 projecting inwardly therefrom and connected by the bolts 8 with the steering arm connecting rod 9. A link 10 extends from this connecting rod to the steering post mechanism. 11 designates each of the usual radius rods which are connected at their forward ends to the end portions of the axle and which are disposed in V-relation and connected at their inner ends to the ball head 12, which is adapted to be secured to the engine casing (not shown).

The present embodiment of my attachment comprises a pair of upper and lower brace rods 13 each having its end portions offset to define a seating shoulder 14 and these rods are disposed transversely between inner or rearward portions of the radius rods 11, the end portions of the bars crossing the radius rods above and below the same, the extremities of the bars being connected by the clamp bolts 15 each clamping said bars against the radius rods and thus confining the radius rods between the shoulders 14 and said bolts whereby the brace bars are rigidly secured in place, it being noted that the shoulders 18 are inclined to correspond to the inclination of the radius rods.

The intermediate portions of the brace bars are spaced apart by engagement of the bars with the radius rods and a bolt 16 is passed through the central portions of the bars and affords securement between the bars for the inner ends of a pair of link sections 17. A pair of yokes 18, preferably formed of heavy wire, are secured to the junctures of the steering arms 7 and connecting rod 9, by mounting the ends of each yoke on the end portions of the already provided connecting bolts 8. A fairly strong coil spring 19 connects the bight of each yoke 18 with one of the link sections 17.

Thus the steering spindles are resiliently urged to a normal position directing the automobile in a straight path. Inasmuch as the normal stresses exerted on the radius rods tend to buckle them in opposite directions, the brace rods considerably strengthen the radius rods in travel of the vehicle and at the same time afford a most convenient and economical securement for the steering control springs 19.

An exceedingly simple and efficient device has thus been provided which may be cheaply manufactured and most readily attached to a conventional automobile structure.

While I have shown and described a preferred embodiment of my invention it will be appreciated that various changes and modifications of structure may be employed without departing in any manner from the spirit of my invention.

What is claimed is:

The combination with a vehicle front axle structure including an axle, a steering arm disposed at each end of the axle, a steering arm connecting rod having its ends pivoted to said arms, and a brace member comprising a pair of spaced rods, of a yoke straddling each of the pivotal connections between the steering arms and connecting rod and having the ends of its legs pivoted on the pivot bolt thereof, a pair of contractile springs, each having one end attached to one of said yokes, an attaching member comprising a pair of clamp plates extending across the rods of said brace member on opposite sides thereof, clamp bolts securing the plates together and gripping the brace rods therebetween, and an attaching bolt extended through the clamp plates intermediate the ends thereof, the ends of the springs opposite the ends connected to the yokes being secured between said clamp plates by said attaching bolt.

In testimony that I claim the foregoing I have hereunto set my hand at Milwaukee, in the county of Milwaukee and State of Wisconsin.

ARTHUR SENGER.